Patented Nov. 7, 1922.

1,434,663

UNITED STATES PATENT OFFICE.

CHARLES ORTEGA, OF SAN DIEGO, CALIFORNIA.

METHOD OF PACKING PIMENTOS.

No Drawing.   Application filed December 17, 1920.   Serial No. 431,509.

*To all whom it may concern:*

Be it known that I, CHARLES ORTEGA, a citizen of the United States, residing at San Diego, in the county of San Diego and State of California, have invented certain new and useful Methods of Packing Pimentos, of which the following is a specification.

My invention relates to the method for flavoring and packing pimentos and the objects of my invention are: First, to provide packed pimentos with special flavoring; second, to provide packed pimentos which are very delicious; third, to provide a novel method of packing and preparing pimentos; fourth, to provide a novel pimento product, and fifth, to provide a novel product and method of this class which is very economical and easy to produce and a very efficient process.

With these and other objects in view as will appear hereinafter my invention consists of a certain novel packed pimento and certain novel method of packing the same and certain method of producing flavoring for the same as will be hereinafter described in detail and particularly set forth in the appended claims.

Although I understand my invention might be applicable to various kinds of packed vegetables and fruits it is particularly applicable to pimentos and green chilis and I will therefore hereinafter refer to the product and process in relation to pimentos.

It is generally understood that in the method generally employed in packing pimentos, that the pimentos are first scalded to remove the peel, then cored and packed in cans with considerable liquid from the pimentos in connection therewith and in some cases certain known flavorings are used in connection.

I have discovered that a special flavoring produced from tomatoes under a certain process introduced in connection with the pimentos gives it a special and delicate flavor which is very palatable and highly delicious in flavor.

I have also discovered that by removing a portion of the fluid from the pimentos under a certain process causes the pimento to remain whole while packing, without in any way toughening the same.

In carrying out my method for producing the product I prefer to proceed in the following manner:

First: The outer surface of the pimento is roasted by subjecting its outer surface to a heated surface which causes the easy removal of the peel while the body of the pimento remains intact. The pimento is then cored and washed. It is then subjected to sweating by steaming, preferably in a steam chest where it is subjected to live steam until about one-fourth of a pound of water is removed from three pounds of pimento, after which the pimento is seasoned with salt and like seasonings, then packed in cans and a special flavoring added, which flavoring is produced by steaming and crushing tomatoes, skimming the upper surface and letting stand about twelve hours, after which the liquid therefrom is drawn from the bottom, strained and is ready to be added to the pimento as hereinbefore set forth, after which the can is closed in the conventional manner.

Although I have disclosed a certain pimento product and a certain method of packing and preserving the same, I do not wish to be limited to the particular description for packing and preserving the pimento but desire to include in the purview of my invention the packed pimento and method of producing the same substantially as set forth in the appended claims.

Having thus described my invention what I claim as new and desire to secure by Letters Patent is:

1. As a new article of manufacture, pimentos packed in containers with liquid drawn from cooked tomatoes.

2. The herein described method of packing pimentos, consisting in subjecting the outer surface of the pimento to a heated surface for loosening the peel, then removing the peel, then coring the pimento, then washing the same, then subjecting it to steam until about one-fourth of a pound of juice is removed to three pounds of pimento, then seasoning, then packing them in a receptacle, then introducing a liquid produced by steaming peeled tomatoes, crushing the same and letting the mass stand for about twelve hours, then drawing the liquid from the bottom.

3. The herein described method of packing pimentos, consisting in roasting the outer surface of the pimento for loosening the peel, then removing the peel, then coring the pimento, then sweating until a portion of the water is removed from the pimento, then seasoning, then substituting a liquid formed from cooked, crushed tomatoes as a substitute for the water removed.

4. The herein described method of flavoring and preserving pimentos, consisting in introducing in the can with the pimentos, a liquid produced by steaming, skimming and crushing tomatoes, then letting the mass stand about twelve hours, then drawing said liquid from the bottom.

5. The herein described method of packing and preserving pimentos, consisting in first removing the peel, then coring the pimento, then seasoning the pimento, then packing the same together with a liquid produced by steaming and crushing tomatoes, then skimming the top therefrom, then leaving the mass stand about twelve hours, then drawing said liquid from the bottom.

6. The herein described method of packing and preserving pimentos, consisting in peeling, coring and preparing the pimento for packing, then packing the same with a liquid produced by cooking and crushing the tomatoes, skimming the top, letting the mass stand about twelve hours, then drawing the liquid from the bottom.

In testimony whereof, I have hereunto set my hand at San Diego, California, this 6th day of December, 1920.

CHARLES ORTEGA.